(12) United States Patent
Tansbo et al.

(10) Patent No.: US 7,343,838 B2
(45) Date of Patent: Mar. 18, 2008

(54) TOOL DEVICE

(76) Inventors: Owe Tansbo, Källtorpet, Vintrosa (SE) S-719; Hans Hallberg, Strömbergsgatan 25, Orebro (SE) S 702 20

( * ) Notice: Subject to any disclaimer, the term of this patent is extended or adjusted under 35 U.S.C. 154(b) by 0 days.

(21) Appl. No.: 10/565,231

(22) PCT Filed: Oct. 27, 2005

(86) PCT No.: PCT/SE2005/001616
§ 371 (c)(1),
(2), (4) Date: Jan. 18, 2006

(87) PCT Pub. No.: WO2006/046920
PCT Pub. Date: May 4, 2006

(65) Prior Publication Data
US 2007/0000359 A1    Jan. 4, 2007

(30) Foreign Application Priority Data
Oct. 29, 2004  (SE) ..................... 0402619

(51) Int. Cl.
*B25G 1/08* (2006.01)
*B25F 1/04* (2006.01)
*B25B 23/16* (2006.01)

(52) U.S. Cl. ............... 81/440; 81/177.6; 7/168

(58) Field of Classification Search ........... 81/440, 81/177.4, 177.6; 7/118, 168
See application file for complete search history.

(56) References Cited

U.S. PATENT DOCUMENTS

| | | | | | |
|---|---|---|---|---|---|
| 2,473,758 | A | * | 6/1949 | Maitlen | 15/104.05 |
| 2,503,380 | A | * | 4/1950 | Derby | 206/374 |
| 4,006,613 | A | * | 2/1977 | Zion | 70/394 |
| 4,010,663 | A | * | 3/1977 | Rydberg | 81/440 |
| 4,204,294 | A | * | 5/1980 | Halverson | 15/185 |
| 5,711,194 | A | | 1/1998 | Anderson et al. | 81/440 |
| 6,088,861 | A | * | 7/2000 | Sessions et al. | 7/128 |
| 2004/0181880 | A1 | | 9/2004 | McIntosh et al. | 7/129 |

FOREIGN PATENT DOCUMENTS

WO    WO 99/37446    7/1999

* cited by examiner

*Primary Examiner*—David B Thomas
(74) *Attorney, Agent, or Firm*—Hayes Soloway P.C.

(57) ABSTRACT

A tool device comprising two sides connected by two axles on which one or several functional tools and two covers are arranged. The tool device is configured to provide a stable T-construction by opening a first cover arranged on a first axle, rotating one of the functional tools arranged on the second axle (such as a thread tap) to 90°, closing the first cover and rotating the second cover 180°. The covers preferably include notches for engaging the functional tool rotated to 90° in a fixed position.

13 Claims, 4 Drawing Sheets

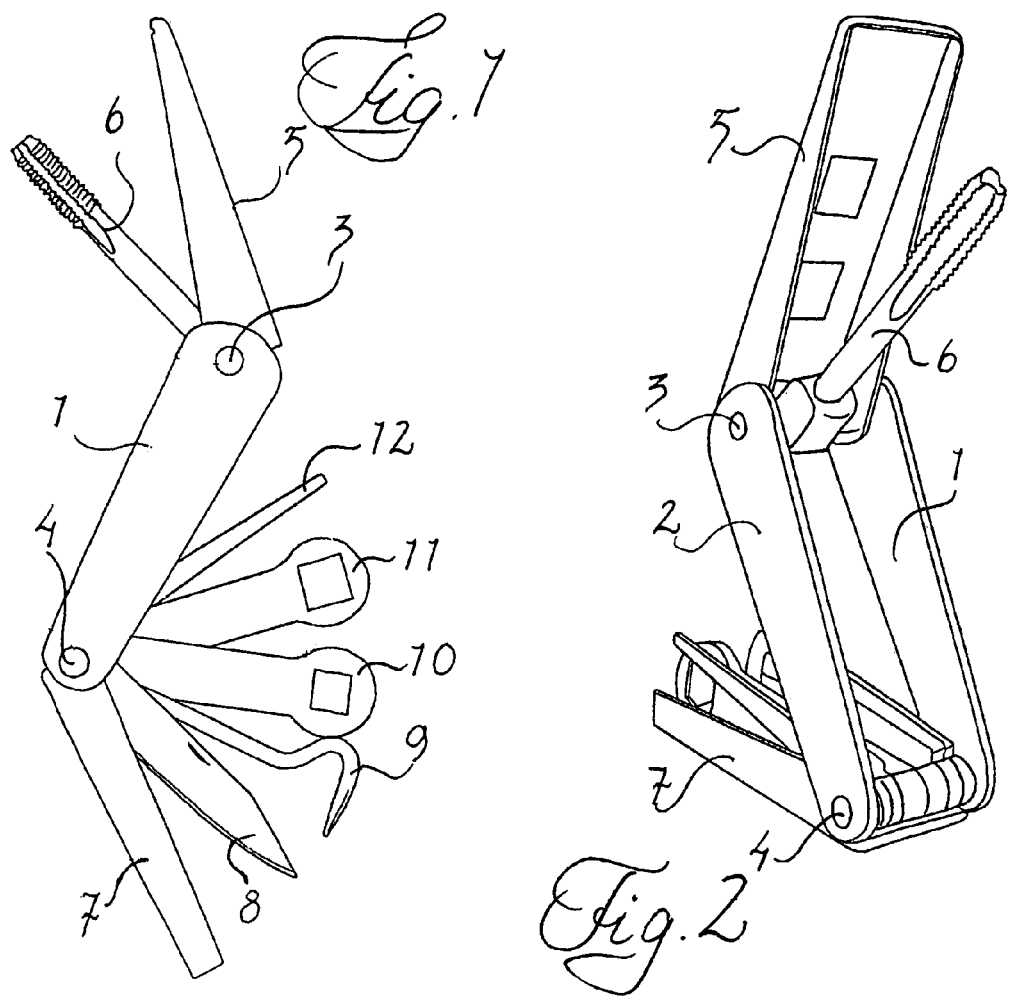
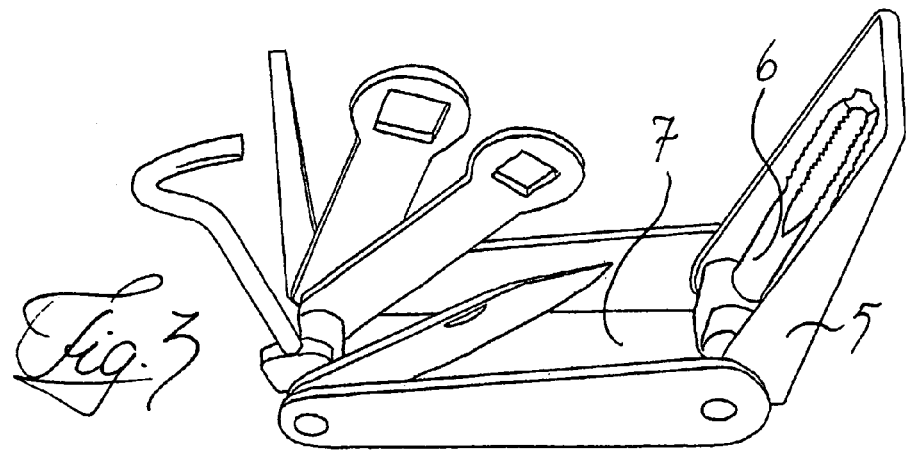

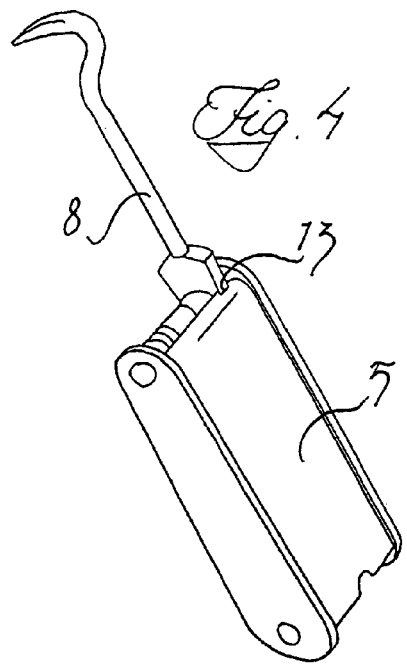
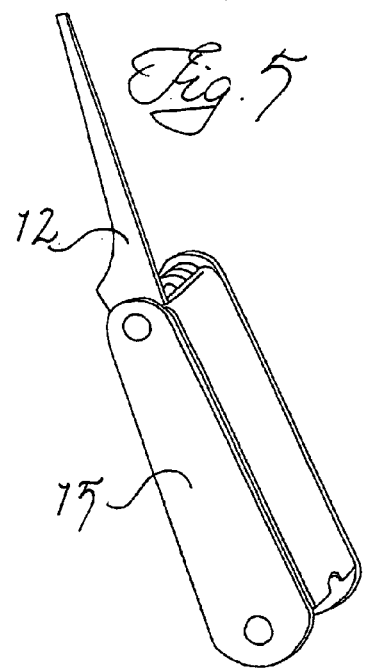
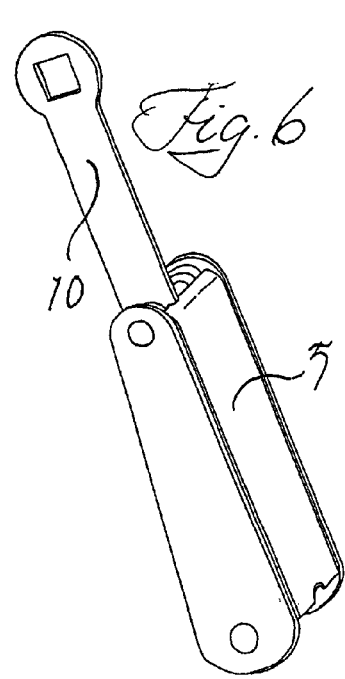
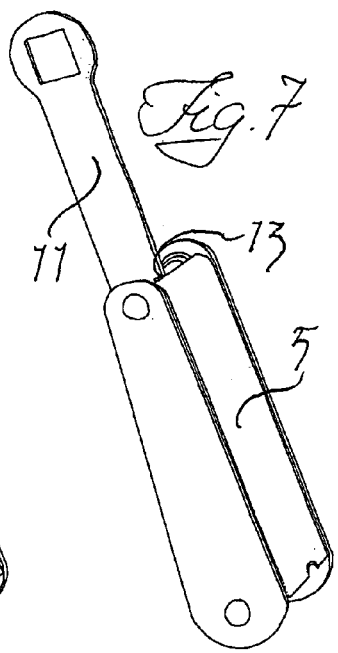
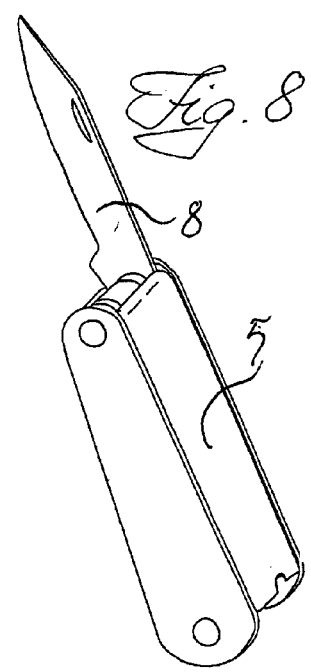

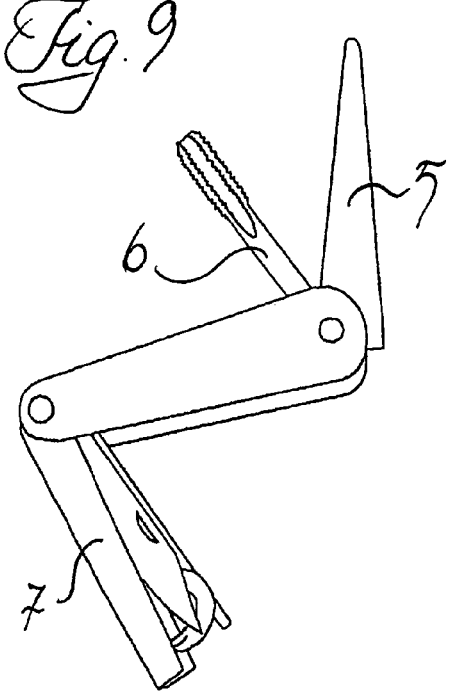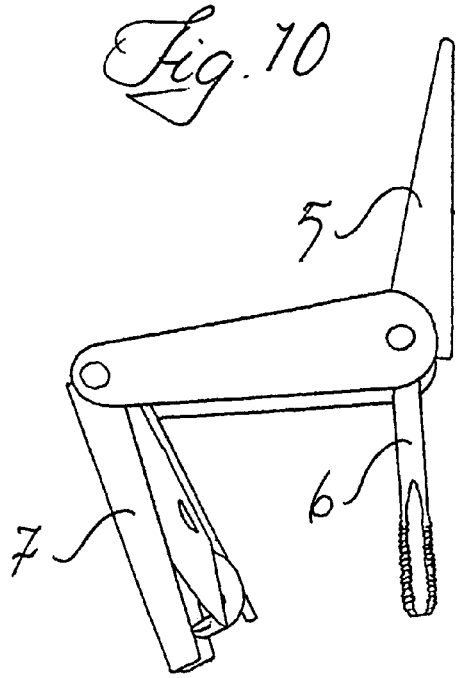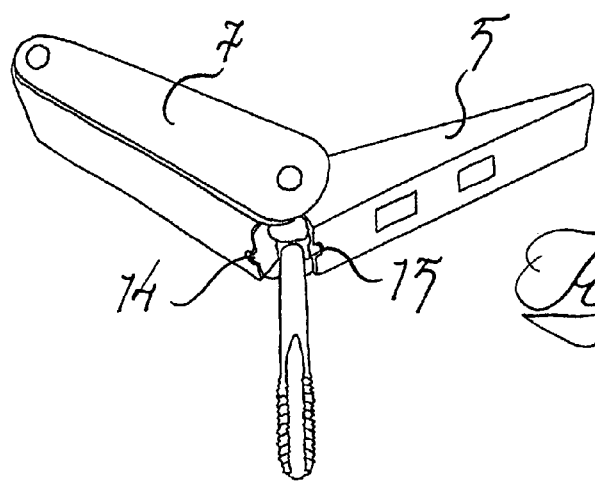

TOOL DEVICE

FIELD OF THE INVENTION

This invention relates to a tool device or tool carrier and more specifically to a folding tool device or tool carrier in which the functional tools are pivotally mounted on axles for convenient use and compact storage.

BACKGROUND OF THE INVENTION

This invention concerns a tool device or tool carrier that comprises, generally, two elongated side pieces connected by axles at either end of the device, wherein one or several tools or tool holders are pivotally or rotatably mounted on one or both of the axles. The sides of the device have sufficient length for storing the functional tools.

Examples of prior art include pocketknives that can include different work tools as knife, can-opener, corkscrew etc. The corkscrew is usually mounted rotatably on a third centrally placed axle so that it may be extended about 90° from the main body of the tool and form a T handle for turning the corkscrew.

Unfortunately, as those who may have tried to use such a corkscrew, the corkscrew has a tendency to fold, necessitating a very precise application of force.

Combination tools are also desired in other situations, for example, the mounting and removal of horseshoe calks or frost nails. Such a tool necessitates, in addition to one or several box wrenches, a thread tap to repair the threads in the shoes for the calks. The use of a thread tap also requires precise tool placementas well as the ability to achieve the proper torque. In this instance, the pocketknife configuration is not suitable, as it does not provide enough stability or torque.

Examples of prior art include U.S. Pat. Nos. 2,473,758; 4,010,663; 4,204,294; and 6,088,861.

SUMMARY OF THE INVENTION

There presently exists a need for a tool device that can form a stable T-construction. The present invention solves this problem by providing a tool device or tool carrier as previously described with two covers, one on each side of the device, wherein the covers are rotatably or pivotally mounted each on separate axles. The covers are designed as the means to lock a functional tool into place.

In a first embodiment, this locking feature of the covers is achieved by rotating a first cover 180° so that a functional tool, rotatably mounted on the same axle as the first cover, when rotated 90° in the opposite direction may be fixed between the ends of the two covers. This configuration provides the stability and leverage lacking in the prior art.

Other embodiments include the ability to fix fully extended tools in place by designing contact surfaces on the tools that fit together with corresponding surfaces on the respective covers. Moreover, the corresponding surface on the cover may be in the form of an end tab or flange that serves to snap the cover into position, whether that position is in fully extended or in a closed or folded position.

BRIEF DESCRIPTION OF THE DRAWINGS

Further features and advantages of the invention will be seen from the following detailed description, taken in conjunction with the accompanying drawings, wherein like numerals depict like parts, and wherein:

FIG. 1 is an illustration of a side view of a combination tool device according to the present invention;

FIGS. 2 and 3 are perspective views of the combination tool device depicted in FIG. 1;

FIGS. 4 through 8 are perspective views of the combination tool device with a single tool shown rotated for use;

FIGS. 9 through 12 show how a thread tap tool is selected and fixed in place for use.

DETAILED DESCRIPTION OF THE INVENTION

Figure 12:
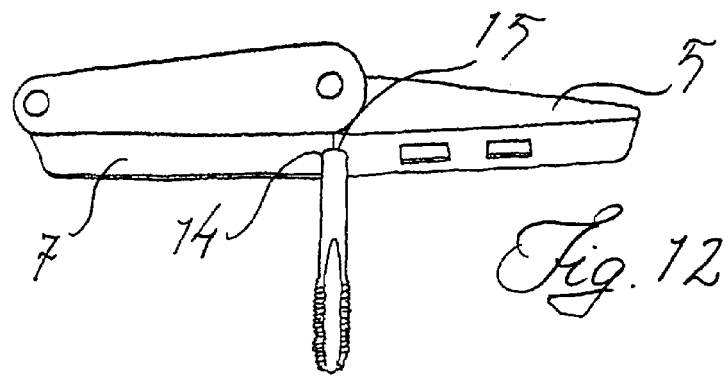

Referring to FIGS. 1-3, the combination tool has two sides 1 and 2 that are connected by two axles 3 and 4 at their respective ends. On the axle 3, a cover 5 and a thread tap 6 are pivotally mounted. The sides of the tool may be wider at this end, as illustrated in the drawings. On the other axle 4, a second cover 7 is pivotally mounted along with a knife blade 8, hook 9, two fixed box wrenches or keys 10 and 11, and a pick 12 e.g. for the removal of hard set clay or gravel etc. from threaded holes in the horseshoes where calks are to be mounted. The thread tap or thread tapping 6 is intended for repairing the threads when they have been damaged, which may occur when pebbles are pushed into the holes in a non-calked shoe.

In the context of horseshoes, calks and frostnails are frequently mounted and dismounted. For example, calks must be removed before placing a horse in transport to avoid damaging the carrier. Calks also could cause damage to other horses. Further, the calks may be specific to certain types of terrain; e.g., longer calks for grassy surfaces and shorter calks with metal tips for icy roads.

Referring to FIGS. 4-8, the different functional tools that are pivotally mounted to axle 4 are rotated to a functional position by lifting cover 5 that is pivotally mounted to axle 3. Thereafter cover 5 is returned to its original position and pressed in behind a shoulder 13 present on each tool bracket. A corresponding shoulder is present that on the opposite side of the tool that is in contact with cover 7. This creates a very stable locked position for the functional tool when it is extended for use. The shoulders 13 are arranged so that the covers 5 and 7 become tangential to the shoulders 13, making the locking feature very reliable. This is important because one does not want to risk having the knife or one of the other functional tools fold over onto one's fingers in use. In addition, a sturdy hand grip may be included to improve the functionality of the device. For greater torque, which is often required for removing calks, the cover that rotates about the axle that is opposite the tool being used may be pivotal outwards, creating a longer lever.

FIGS. 9-12 show how the combination tool device is opened to use the thread tap 6. Both covers are opened and the thread tap 6 is pivoted in a direction opposite to that of the cover 5 that is mounted on the same axle 3 (see FIG. 10). The cover 7 that pivots about the opposite axle 4 is brought back to its original position. Cover 5 is fully extended until both covers 5 and 7 align. Each cover has a semicircular notch 14,15 that is arranged to stabilize the thread tap 6. In this manner, the covers absorb the bending forces that would otherwise cause the thread tap 6 to fold. This configuration creates a large T-handle with excellent leverage and superior stability.

If desired, the thread tap 6 may be removed from the device by placing an Allen wrench in the square key grip at the base of the thread tap.

The thread tap also may be extended from the end of the device similar to the other tools as shown in FIGS. 4-8. This may be desired, for instance, when the thread tap 6 is being used to clean a hole and not to correct the threads.

Figure 13:
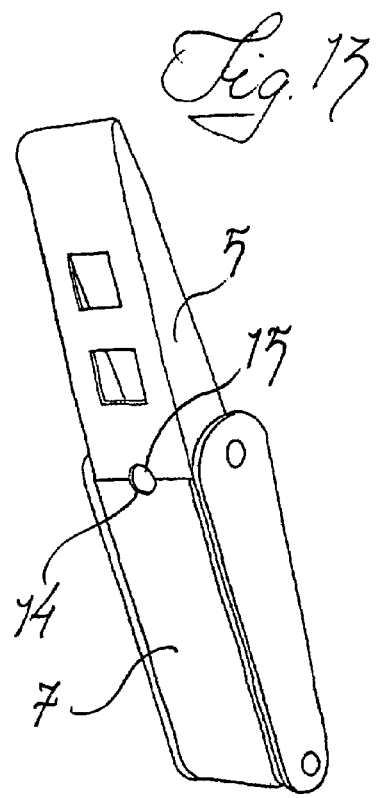
FIGS. 13 and 14 show the combination tool device of FIG. 1 with one of the cover members open and closed, respectively.

FIG. 13 shows how cover 5 is rotated to 180°. Two square holes in cover 5 may be used as keys or box wrenches and the remainder of the tool is used as a lever.

Figure 14:
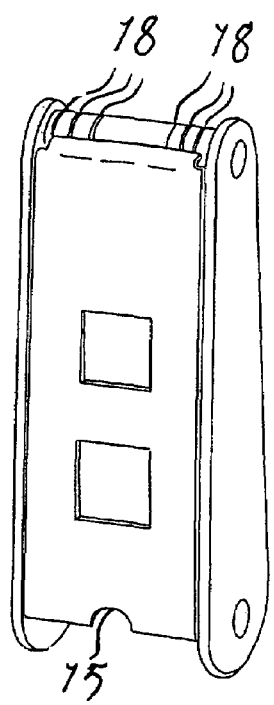

FIG. 14 shows how the tool is folded. The two square holes in cover 5 also may be used as keys or box wrenches in this position as well. As also shown in FIG. 14, friction washers 18 may be placed on the axles between the different tools. This is done to keep the tools in their respective positions.

Furthermore, it is also possible to form additional protrusions and/or depressions in the covers with corresponding features in the opposite cover to allow the device to snap or otherwise become fixed in an open or closed position.

Additional thread taps also may be included in the device together with additional keys. Also, the keys may be triangular in shape to allow gripping of different types of tools in a wedge-like action. These triangular keys may also be used as a square key when the device is in a position as shown in FIG. 13, where the covers together form a pliers-like device that can be pressed together by the cover journaled in the wider end being pressed against the T-handle position.

The above described tool device use different manners of locking in the two ends, one can however if so is desired use the same locking manner in both ends. Yet other embodiments may be made without departing materially from the spirit and scope of the invention as defined in the appended claims.

The invention claimed is:

1. A combination folding tool comprising first and second side members arranged spaced from one another and connected adjacent their respective ends by first and second axles;
    at least one functional tool pivotally mounted on at least one of said first and second axles; and
    first and second cover members pivotally mounted at their proximal ends to the first and second axles, respectively, whereupon a functional tool pivotally operatively extended from an axle will be locked in place between the proximal end of one cover member pivotally mounted to the same axle as the tool, and a distal end of the other cover member.

2. The tool according to claim 1, wherein at least one of the functional tools comprises a thread tapping tool.

3. The tool according to claim 2, wherein the tapping tool is removable.

4. The tool device according to claim 1, wherein a first notch is provided in the proximal end of the one cover member and a second notch is provided in the distal end of the other cover member for engaging and holding the functional tool in a locked position.

5. The tool device according to claim 1, wherein at least one of the functional tools is provided with shoulders for engaging the cover members.

6. The tool according to claim 1, wherein the cover members are made of sheet metal in which side edges of the cover members are bent inward.

7. The tool according to claim 1, wherein one or more keys or boxes are formed in the cover members.

8. The tool accordingly to claim 7, wherein the keys are square or triangular.

9. The tool according to claim 1, wherein at least one of the functional tools comprises a pick.

10. The tool according to claim 1, wherein at least one of the functional tools comprises a blade.

11. The tool according to claim 1, wherein at least one of the functional tools comprises a hook.

12. The tool according to claim 1, wherein at least one of the functional tools comprises a box wrench.

13. The tool according to claim 1, wherein at least one functional tool is pivotally mounted on each of said first and second axles.

* * * * *